United States Patent
Mishra et al.

(10) Patent No.: US 12,549,404 B2
(45) Date of Patent: Feb. 10, 2026

(54) MULTICAST BANDWIDTH UTILIZATION AND REACTIVE BANDWIDTH CONTROL POLICIES

(71) Applicant: Cisco Technology, Inc., San Jose, CA (US)

(72) Inventors: Mankamana Prasad Mishra, San Jose, CA (US); Lukas Krattiger, Pleasanton, CA (US); Sameer R Gulrajani, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 18/498,830

(22) Filed: Oct. 31, 2023

(65) Prior Publication Data
US 2025/0141707 A1    May 1, 2025

(51) Int. Cl.
*H04L 12/18* (2006.01)
*H04L 41/22* (2022.01)

(52) U.S. Cl.
CPC .......... *H04L 12/1886* (2013.01); *H04L 41/22* (2013.01)

(58) Field of Classification Search
CPC ..... H04L 12/1886; H04L 41/22; H04L 45/12; H04L 45/16; H04L 65/4076
USPC ........................................................ 709/238
See application file for complete search history.

(56) References Cited

U.S. PATENT DOCUMENTS

| | | | |
|---|---|---|---|
| 7,830,787 B1 * | 11/2010 | Wijnands | H04L 12/18 370/230.1 |
| 2013/0010649 A1 | 1/2013 | Napierala et al. | |
| 2013/0315057 A1 | 11/2013 | Popa et al. | |
| 2017/0201451 A1 * | 7/2017 | Allan | H04L 45/48 |
| 2020/0412639 A1 * | 12/2020 | Meo | H04L 45/125 |

FOREIGN PATENT DOCUMENTS

| | | |
|---|---|---|
| CN | 101483598 | 7/2009 |
| CN | 102970236 | 3/2013 |

OTHER PUBLICATIONS

Makofske et al., "Real-Time Multicast Tree Visualization and Monitoring," CiteSeerX, Mar. 24, 2000, pp. 1-24.

\* cited by examiner

*Primary Examiner* — Glenford J Madamba
(74) *Attorney, Agent, or Firm* — Polsinelli P.C.

(57) ABSTRACT

A method includes generating a visual representation of one or more multicast data trees over a service provider network, each multicast data tree exchanging data between two or more of a plurality of nodes of an entity operating over the service provider network; determining a respective network bandwidth usage over each of the one or more multicast data trees and a network bandwidth waste based on current bandwidth usage of existing data tunnels of one or more multicast data trees and replication distances associated with the plurality of nodes; modifying the one or more multicast data trees based on at least the respective network bandwidth usage over each of the one or more multicast data trees to yield a modification; generating a traffic routing policy to implement the modification; and transmitting a notification to a subset of the plurality of nodes affected by the traffic routing policy.

20 Claims, 8 Drawing Sheets

MULTICAST BANDWIDTH UTILIZATION AND REACTIVE BANDWIDTH CONTROL POLICIES

TECHNICAL FIELD

The present disclosure relates to communication systems, and in particular, visualization of network traffic routing in a multicast network using multicast deployment trees and adaptive control policies to manage bandwidth and reduce bandwidth usage in the network.

BACKGROUND

A computer network may refer to a group of computing components (e.g., gateways, routers, end devices, etc.) that communicate over network connections. Computer networks may support many applications and services. As an example, computer networks may support cloud-based services, such as software-as-a-service and infrastructure-as-a-service services.

A multicast network is generally formed of multiple segments including one or more customer networks having different sites connected over a provider network that is separate from the customer networks (independently operated). The operator network can provide service to the one or more customer networks to carry multicast traffic across multiple sites.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
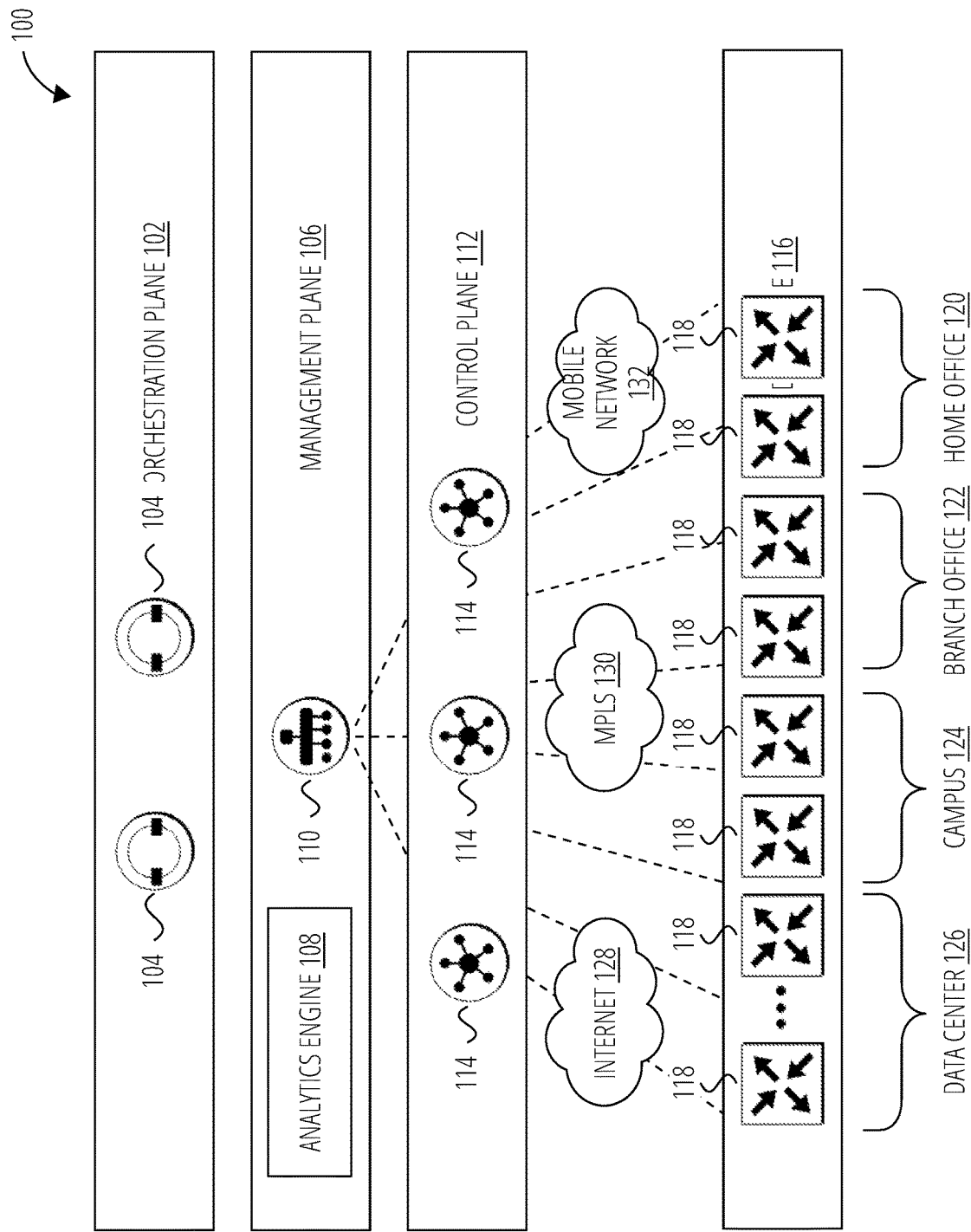
FIG. 1 illustrates an example of a high-level network architecture according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Aspects of the present disclosure are directed to systems and method for providing a holistic view of multicast flows and associated Multicast Distribution Trees (MDTs) in a provider network, determining bandwidth usage/waste and relative distance of provider edges in the provider network, and generating (updating) multicast routing policies in the network in order to optimize the transmission of flows across MDTs.

In one aspect, a method includes generating a visual representation of one or more multicast data trees over a service provider network, each of the one or more multicast data trees exchanging data between two or more of a plurality of nodes of an entity operating over the service provider network; determining a respective network bandwidth usage over each of the one or more multicast data trees and a network bandwidth waste based on current bandwidth usage of existing data tunnels of one or more multicast data trees and replication distances associated with the plurality of nodes; modifying the one or more multicast data trees based on at least the respective network bandwidth usage over each of the one or more multicast data trees to yield a modification; generating a traffic routing policy to implement the modification; and transmitting a notification to a subset of the plurality of nodes affected by the traffic routing policy.

In another aspect, the method further includes implementing the traffic routing policy using the visual representation of the one or more multicast data trees.

In another aspect, implementing the traffic routing policy includes visually modifying at least one of the one or more multicast data trees.

In another aspect, modifying the one or more multicast data trees comprises generating at least one new multicast data tree to be used for network traffic routing.

In another aspect, the at least one new multicast data tree is generated if the respective network bandwidth of at least one of the one more multicast trees exceeds a threshold.

In another aspect, modifying the one or more multicast data trees is further based on a respective distances between two or more of the plurality of nodes associated with each of the one or more multicast data trees.

In another aspect, each of the plurality of nodes is a provider edge node associated with the entity.

In one aspect, a network controller includes one or more memories having computer-readable instructions stored therein, and one or more processors. The one or more processors are configured to execute the computer-readable instructions to generate a visual representation of one or more multicast data trees over a service provider network, each of the one or more multicast data trees exchanging data between two or more of a plurality of nodes of an entity operating over the service provider network; determine a respective network bandwidth usage over each of the one or more multicast data trees and a network bandwidth waste based on current bandwidth usage of existing data tunnels of one or more multicast data trees and replication distances associated with the plurality of nodes; modify the one or more multicast data trees based on at least the respective network bandwidth usage over each of the one or more multicast data trees to yield a modification; generate a traffic routing policy to implement the modification; and transmit a notification to a subset of the plurality of nodes affected by the traffic routing policy.

In one aspect, one or more non-transitory computer-readable media include computer-readable instructions, which when executed by one or more processors of a network controller, cause the network controller to generate a visual representation of one or more multicast data trees over a service provider network, each of the one or more multicast data trees exchanging data between two or more of a plurality of nodes of an entity operating over the service provider network; determine a respective network bandwidth usage over each of the one or more multicast data trees and a network bandwidth waste based on current bandwidth usage of existing data tunnels of one or more multicast data trees and replication distances associated with the plurality of nodes; modify the one or more multicast data trees based on at least the respective network bandwidth usage over each of the one or more multicast data trees to yield a modification; generate a traffic routing policy to implement the modification; and transmit a notification to a subset of the plurality of nodes affected by the traffic routing policy.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110 and an analytics engine 108. In some embodiments, the network management appliances 110 can provide centralized management of the network using output of analytics engine 108 and via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively, or in addition, the network management appliances 110 can be a dedicated network management system for a single entity. In some embodiments, physical or virtual Cisco® SD-WAN vManage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 118.

Figure 2:
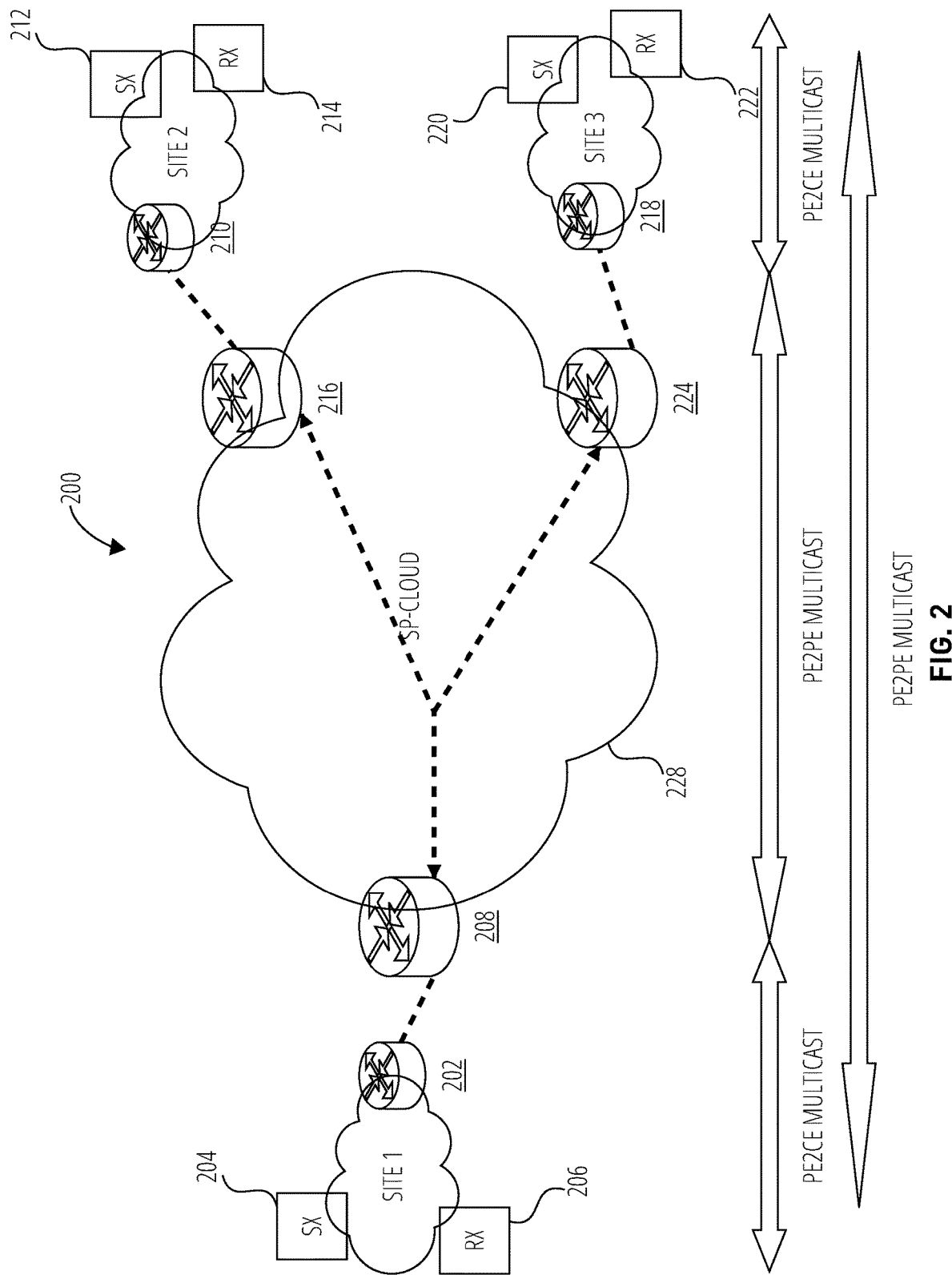
FIG. 2 illustrates an example of an example of a multicast network architecture according to some aspects of the present disclosure.

FIG. 2 illustrates an example of an example of a multicast network architecture according to some aspects of the present disclosure. Example multicast network architecture 200 comprises two different networks. One network may be referred to as a customer network that includes site 1, site 2, and site 3 as shown in FIG. 2. This customer network may be an enterprise network having example network architecture 100 of FIG. 1. The other network in example multicast network architecture 200 is a service provider network (SP-cloud 228). SP-cloud 228 may be for example, a public mobile/cellular network, a network of an internet service provider, etc.

As mentioned, customer network in this example is formed of sites 1, 2, and 3. Site 1 may include Customer Equipment (CE) 202 that can be any type of known or to be developed gateway providing connectivity for SP-cloud 228 for site 1. Site 1 can further include one or more terminals (e.g., laptops, IoTs, etc.), connected thereto that can send and/or receive network traffic. Example of such devices can be a data transmitter (Sx 204) and receiver (Rx 206). While not shown in FIG. 2, site 1 can further include any other type of known or to be developed component. Furthermore, site 1 can have more than one CE, one Rx, and Sx.

Similarly, site 2 may include Customer Equipment (CE) 210 that can be any type of known or to be developed gateway providing connectivity for SP-cloud 228 for site 2. Site 2 can further include one or more terminals (e.g., laptops, IoTs, etc.), connected thereto that can send and/or receive network traffic. Example of such devices can be a data transmitter (Sx 212) and receiver (Rx 214). While not shown in FIG. 2, site 2 can further include any other type of known or to be developed component. Furthermore, site 2 can have more than one CE, one Rx, and Sx.

Similarly, site 3 may include Customer Equipment (CE) 218 that can be any type of known or to be developed gateway providing connectivity for SP-cloud 228 for site 3. Site 3 can further include one or more terminals (e.g., laptops, IoTs, etc.), connected thereto that can send and/or receive network traffic. Example of such devices can be a data transmitter (Sx 220) and receiver (Rx 222). While not shown in FIG. 2, site 3 can further include any other type of known or to be developed component. Furthermore, site 3 can have more than one CE, one Rx, and Sx.

SP-cloud 228, among other components, can include a number of Provider Edges (PE) such as PE 208, PE 216, and PE 224. PE 208 may be a border gateway of SP-cloud 228 that is communicatively coupled to CE 202 to connect site 1 of customer network to SP-cloud 228 and thereafter to site 2 and/or site 3. PE 216 may be a border gateway of SP-cloud 228 that is communicatively coupled to CE 210 to connect site 2 of customer network to SP-cloud 228 and thereafter to site 1 and/or site 3. PE 224 may be a border gateway of SP-cloud 228 that is communicatively coupled to CE 218 to connect site 2 of customer network to SP-cloud 228 and thereafter to site 1 and/or site 2.

FIG. 2 also visually illustrates the multicast nature of communication between sites 1, 2, and 3 over SP-cloud 228. As can be seen, PE-to-CE (PE2CE) multicast may be used between SP-cloud 228 and any of sites 1, 2, and 3. Network traffic distribution inside SP-cloud 228 may be implemented using PE-to-PE (PE2PE) routing (e.g., unicast, multicast, label-swap, etc.). Lastly, site-to-site communications may be in the form of CE-to-CE (CE2CE) multicast.

While multicast network architecture 200 illustrates one example customer network communication provider network (SP-cloud 228), the present disclosure is not limited thereto. For instance, more than one customer network may utilize provider network (SP-cloud 228) to carry multicast traffic across their respective sites.

In some examples, a customer network may be represented by a Virtual Private Network (VPN) and inside VPN own multicast protocol are configured. Inside each VPN, per flow state would be created.

A provider network does not bring per VPN state to its own network and that can result into aggregation where customer would be buying "X" number of Point to multipoint tunnels and carry all multicast traffic using these tunnels.

In a unicast connection a source sends network traffic to a single destination. In a multicast connection a source may send network traffic to multiple destinations using a Multicast Distribution Tree (MDT). While a multicast can be implemented as multiple unicasts, doing so constitutes an inefficient use of network bandwidth especially if the unicast routes overlap. Therefore, routers today are capable of replicating packets and sending them out on multiple outgoing interfaces. At the network level, which routers replicate and what interfaces the packets are sent out on is determined by multicast routing algorithms.

In the context of multicast using MDTs, network traffic from a source may be sent over a default MDT, which can be a virtual Local Area Network (LAN) over SP-cloud 228 network. Any network traffic which is being injected in this default MDT can be received by all other connected nodes (e.g., all traffic from PE 208 (received at PE 208 from site 1) is sent to both PE 216 and PE 224) and may either be forwarded to sites 2 and 3 or dropped if there a routing policy dictates such dropping.

A data MDT is a type of MDT in which a source PE can send network traffic to a subset of other PEs. In most multicast deployments, the total number of customer multicast flows are higher than total number of MDTs in the provider network (e.g., SP-cloud 228). This results in multiple flows (associated with one or more customer networks) being aggregated into a single MDT. This aggregation introduces a number of shortcomings.

For instance, tracking of customer flows over different MDTs would be time consuming and complex as the number of flows and MDTs grow. Moreover, aggregation of network traffic in any given MDT may result in some PEs receiving unwanted network traffic. Existing network management tools provide no capabilities to a network operator to holistically observe network flows and MDTs over which network flows are being transported in a network, determine bandwidth usage and waste, and accordingly adopt/modify network traffic routing policies and MDTs in order to optimize the transportation of network traffic over MDTs trees. As will be described below, such modified policies can result in adjusting network traffic transportation over existing MDTs, deleting one or more MDTs, adding new MDTs, etc.

Figure 3:
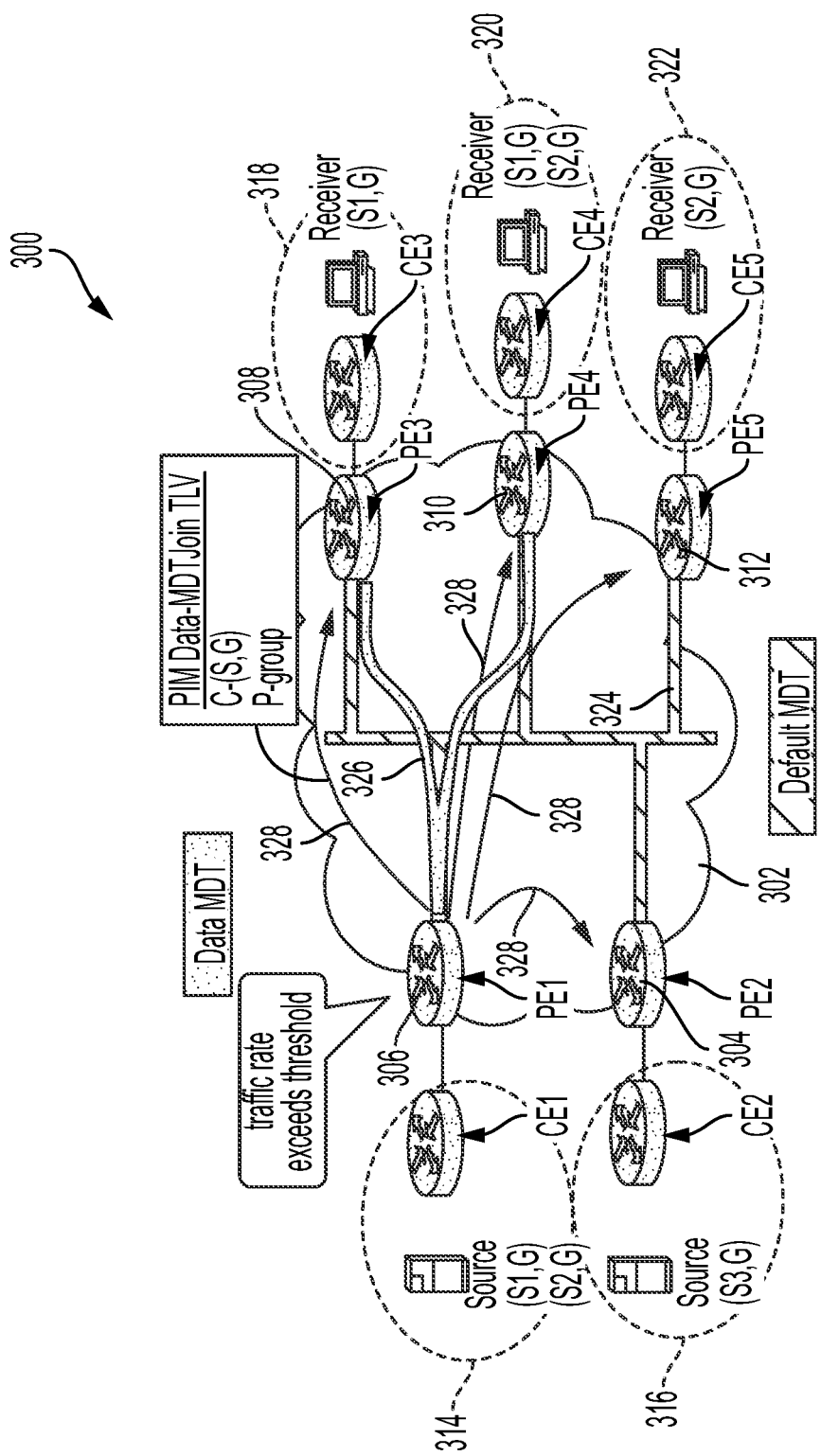
FIG. 3 illustrates several non-limiting examples of MDTs over a provider network according to some aspects of the present disclosure.

FIG. 3 illustrates several non-limiting examples of MDTs over a provider network according to some aspects of the present disclosure. In example configuration (visualization) 300 of FIG. 3, a provider network 302 is shown, which may be the same as SP-cloud 228 of FIG. 2. Similar to SP-cloud 228, provider network 302 may have a plurality of PEs such as PE 304, 306, 308, 310, and 312, which may be the same as PEs 208, 216, and 224 describe above with reference to FIG. 2.

Each of PEs 304-312 may provide network connectivity to a different customer site such as sites 314, 316, 318, 320, and 322, each of which may be the same as sites 1, 2, and 3 described above with reference to FIG. 2. Each of sites 314-322 may have a corresponding CE, a data source and/or a data destination (receiver) as shown. In non-limiting example of FIG. 3, only a source is shown for sites 314 and 316 while only a receiver is shown for sites 318, 320, and 322, since data flow is flow sites 314 and 316 to sites 318, 320, and 322. However, each of sites 314-322 can have both source(s) and receiver(s).

Configuration 300 further illustrates a number of example MDTs in provider network 302. For instance, configuration 300 can include default MDT 324, data MDT 326, and/or Protocol Independent Multicast (PIM) data-MDT 328.

Aspects of the present disclosure provide a software application and an associated Graphical User Interface (GUI) that can visually display a provider network's MDTs and data flows over such MDTs. The software application can also enable a network operator to visually modify the MDTs (e.g., add, delete, etc.) and/or change network traffics from one MDT to another, etc. This may be done using any known or to be developed interactive feature of such a GUI (e.g., a drag and drop option, an interactive script, etc.).

As noted above, aspects of the present disclosure are directed to determining network bandwidth usage and waste over one or more existing (and active) MDTs in a provider network and performing an optimization process to optimize (i.e., reduce network bandwidth waste) transport of traffic over MDTs in the provider network. Examples of this optimization process will be described below with reference to FIGS. 4-6.

Figure 4:
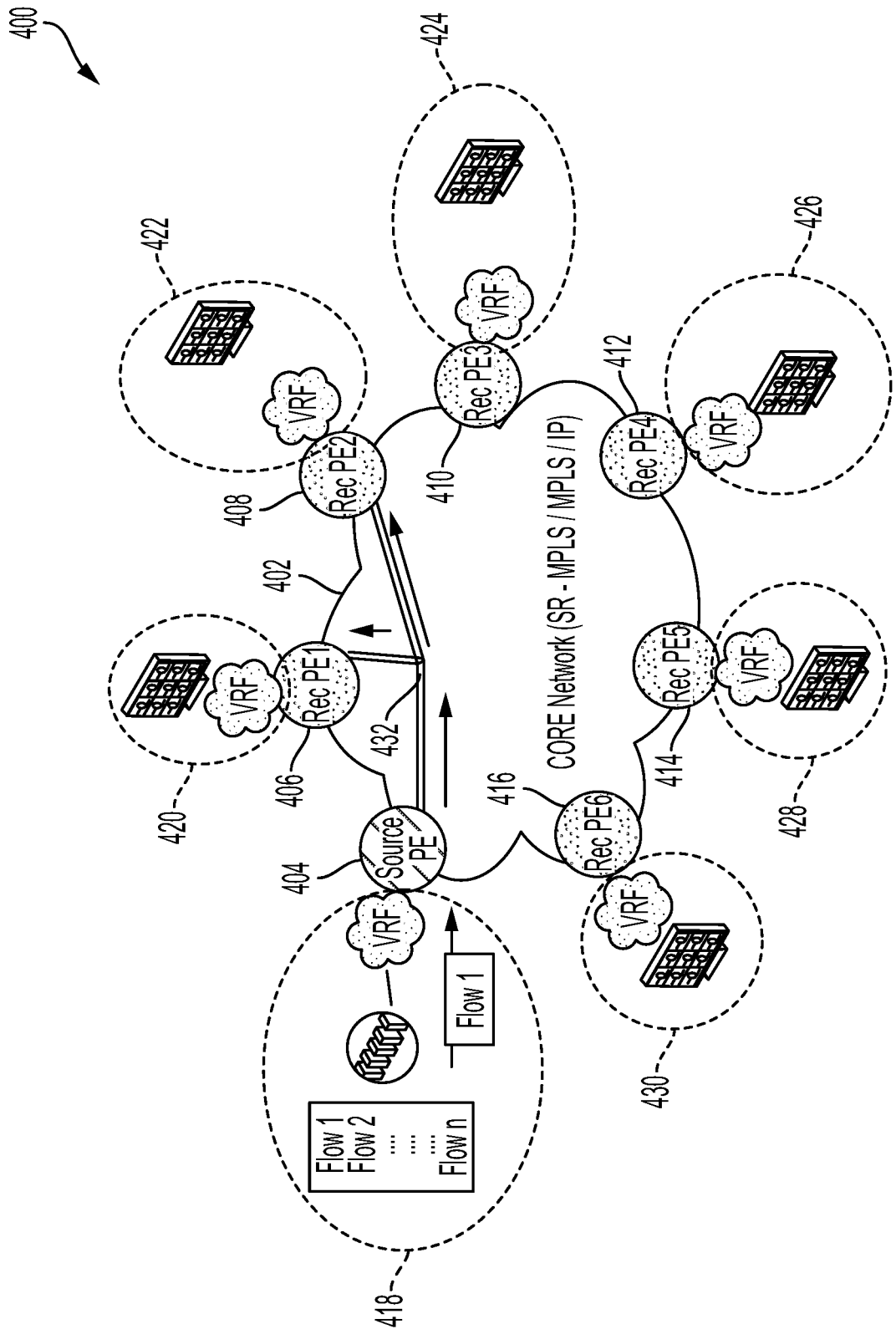
FIG. 4 visually illustrates multicast distribution of network traffic over a provider network according to some aspects of the present disclosure.

FIG. 4 visually illustrates multicast distribution of network traffic over a provider network according to some aspects of the present disclosure. Example configuration 400, shows a provider network 402, which can be the same as SP-cloud 228 described above. A number of PEs 404, 406, 408, 410, 412, 414, and 416 are shown at the edge of provider network 400. These PEs are identified as either a source PE or a receiver PE. Each of PEs 404-416 are communicatively coupled to a different one of customer sites 418, 420, 422, 424, 426, 428, and 430. As described above with reference to FIGS. 2 and 3, each of sites 418-430 have a corresponding CE (identified as a Virtual Routing Function (VRF) in FIG. 4) and an end terminal that can be a source of network traffic, a destination (receiver) of network traffic, etc.

when a receiver PE (e.g., PE 406 and PE 408) gets membership request from a respective local receiver (e.g., VRF in site 420 and VRF in site 422), it notifies source PE about its interest for given customer flow (e.g., flow 1 shown in FIG. 4 over MDT 432), the receiver PE notifies a source PE (e.g., PE 404) of such interest. Thereafter, source PE maps the customer flow to a provider MDT and sends a notification (to a provider network's controller) to join the provider MDT. A provider network's controller may have this information in mapping table such as table-1 below:

TABLE 1

| Tunnel/ MDT | Flows  | Actual Receiver PE(s) | PE Dropping the Flow | Access Bandwidth |
|-------------|--------|-----------------------|----------------------|------------------|
| 432         | Flow 1 | PE 406, PE 408        | None                 | 0                |

Figure 5:
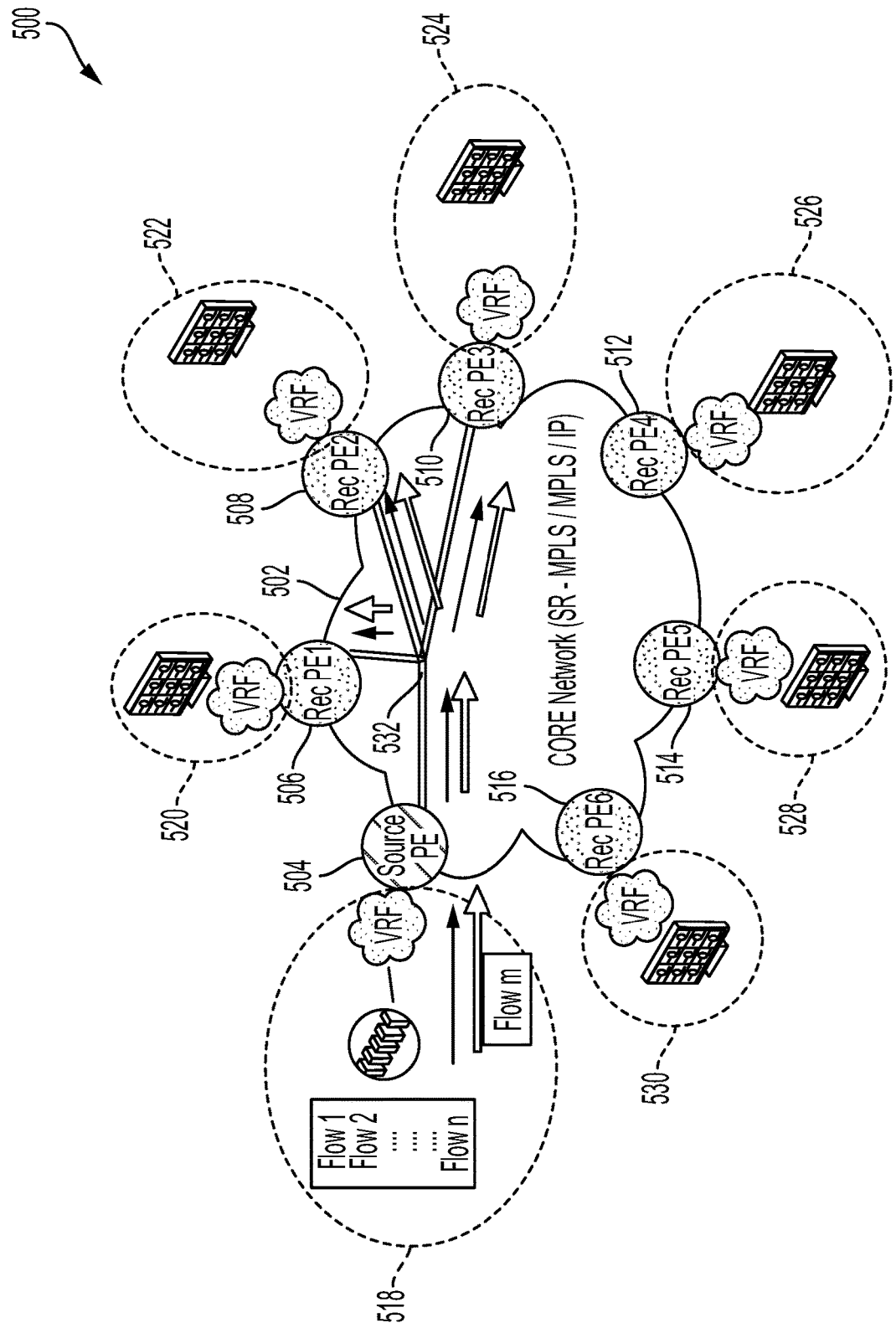
FIG. 5 visually illustrates multicast distribution of network traffic over a provider network according to some aspects of the present disclosure.

FIG. 5 visually illustrates multicast distribution of network traffic over a provider network according to some aspects of the present disclosure. Example configuration 500 is the same as example configuration 400 of FIG. 4 except as described below (e.g., PE 504 is the same as PE 404, site 518 is the same as site 418, etc.). Hence configuration 500 will not be further described except as to the differences below.

After flow 1 is established as described with reference to FIG. 1, a request for flow m, as shown in FIG. 5 may be received from PE 510. Flow m may be a high-bandwidth flow. Furthermore, flow m may be irrelevant to sites 520 and 522 that are associated with PEs 506 and 508 (since PEs 506 and 508 are only interested in flow 1 as described above with reference to FIG. 4). At this point, source PE 504 (same as PE 404), maps flow m to the same MDT tunnel 532 (same as tunnel 432 of FIG. 4) as included in Table-1 above. The updated mapping table may be as shown in table-2 below:

TABLE 2

| Tunnel/MDT | Flows | Actual Receiver PE(s) | PE Dropping the Flow | Access Bandwidth |
|---|---|---|---|---|
| 532 | Flow 1 | PE 506, PE 508 | None | Flow m BW × Nearest Replication Point to PE 510 |
| 532 | Flow m | PE 510 | PE 506, PE 508 | Flow 1 BW × Nearest Replication Point to PE 506 and 510 |

With both flows 1 and m being carried over the MDT shown in FIG. 5, each of PEs 506, 508, and 510 receive the intended flow (one of flows 1 and m) but also receive an unwanted flow (the other one of flows 1 and m).

At this point and in order to determine whether an optimization process for optimizing the MDTs and flow of network traffic therethrough is needed. As can be seen from Table-2, a controller of the provider's network (e.g., network 502) determines an access bandwidth for each flow. This access bandwidth (BW) may be determined based on the given flow's BW and the nearest replication point to the PE that is dropping that particular flow (e.g., nearest replication point for PE 510 for flow 1 and nearest replication point for PE 506 and 508 for flow m).

With hundreds to thousands of sites that a customer network may have as well as hundreds of different MDTs, those having ordinary skill in the art understand how complicated a table such as Table-2 may become when keeping track of all flows across all MDTs.

Figure 6:
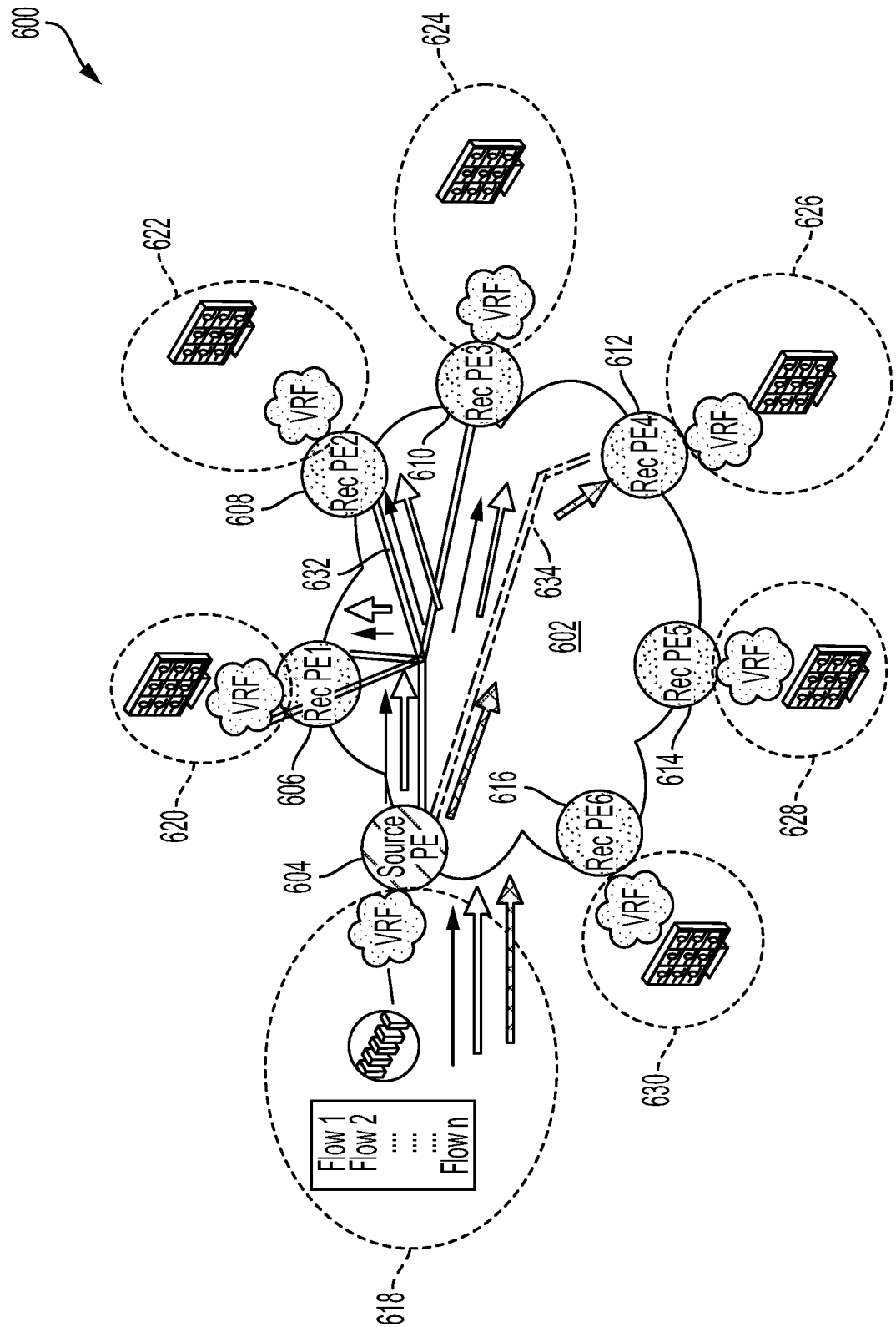
FIG. 6 visually illustrates multicast distribution of network traffic over a provider network according to some aspects of the present disclosure.

FIG. 6 visually illustrates multicast distribution of network traffic over a provider network according to some aspects of the present disclosure. Example configuration 600 is the same as example configuration 400 of FIG. 4 except as described below (e.g., PE 604 is the same as PE 404, site 618 is the same as site 418, etc.). Hence configuration 600 will not be further described except as to the differences below.

In comparison with configurations 400 and 500 of FIGS. 4 and 5, configuration 600 shows 'n' flows and 100 tunnels (e.g., n is an integer greater than or equal to 100). Tunnel #100 (e.g., tunnel 634 shown in FIG. 6) is between PE 604 and receiver PE 626. Table-3 below shows an example mapping table for this scenario:

TABLE 3

| Tunnel/MDT | Flows | Actual Receiver PE(s) | PE Dropping the Flow | Access Bandwidth |
|---|---|---|---|---|
| 632 | Flow 1 | PE 606, PE 608 | None | Flow m BW × Nearest Replication Point to PE 610 |
| 632 | Flow m | PE 610 | PE 606, PE 608 | Flow 1 BW × Nearest Replication Point to PE 606 and 610 |
| 634 | flow n | PE 612 | None | 0 |

In one example, the provider network's controller may determine that bandwidth usage (bandwidth access) of MDT 632 may have exceeded a threshold (this threshold may be a configurable parameter determined based on experiments and/or empirical studies). Alternatively, or in conjunction with determining bandwidth usage of MDT 632, the controller may also determine bandwidth waste of MDT 634 (e.g., more than a threshold capacity of MDT 634's tunnel remains unused, with this threshold also being determined based on experiments and/or empirical studies). Therefore, the controller may determine that moving flow m to MDT 634 may result in bandwidth usage of MDT 632 to drop below the associated threshold and/or bandwidth waste of MDT 634 drops below the associated threshold). In one example, while the controller may determine this optimization, and determine an associated policy for moving flow m from MDT 632 to MDT 634, the controller may not implement the change and it would be up to local policies at different sites (e.g., site 618, site 620, site 622, and/or site 626 to accept the change or not). With both flows 1 and m being carried over the MDT shown in FIG. 6, each of PEs 606, 608, and 610 receive the intended flow (one of flows 1 and m) but also receive an unwanted flow (the other one of flows 1 and m).

In one example, this optimization process may be performed by the operator network's controller periodically (e.g., once a week, once a day, once a month, and/or any other configurable periodicity that may be determined based on experiments and/or empirical studies).

Figure 7:
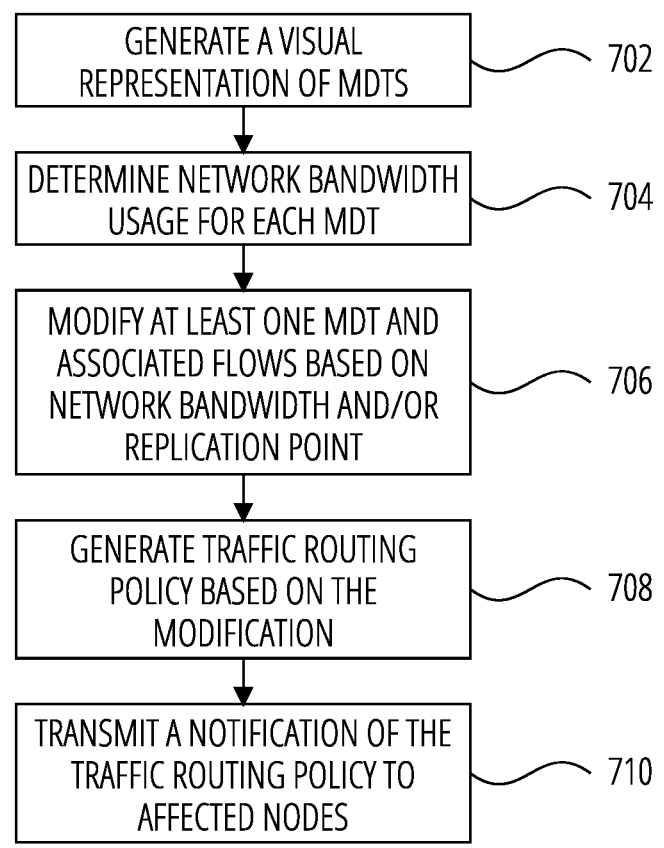
FIG. 7 illustrates a multicast network optimization process according to some aspects of the present disclosure.

FIG. 7 illustrates a multicast network optimization process according to some aspects of the present disclosure. Steps of FIG. 7 will be described with reference to a controller of a provider network such as SP-cloud 228, network 302, 402, etc. While not shown specifically in FIGS. 2-7, a provider network's controller may be any network device that may be cloud-based and is communicatively coupled to various components of the provider network for managing and controlling various operations aspects of the provider network including, but not limited to, the visualization and management of MDTs and associated flows of customer network traffic over the provider network. Such controller may be accessible via any end terminal (e.g., a mobile device, a laptop, a tablet, a desktop). A dashboard may be accessed on such terminal that may have various interactive elements for an operator to interact with and management, among other things, MDTs and associated flows.

At block 702, the controller may generate a visual representation of current MDTs and associated flows in a provider network such as over SP-cloud 228. One non-limiting example of such visualization is shown in FIG. 3. Example visualization 300 may further be accompanied with various visual forms of information that indicate association of flows and MDTs in the provider network (e.g., can be in the form of Table-1, Table-2, Table-3, etc.). As noted above, such visual representation may be provided on the dashboard (e.g., a GUI) that an operate can interact with.

In one example, generating a visual representation may be optional. If so, the process at block 702 may not be performed.

At block 704, the controller may determine bandwidth usage for each MDT. In one example, this process may be performed as described above with reference to FIG. 406 (e.g., with reference to Table-1, Table-2, and Table-3).

In one example, the controller may determine bandwidth usage of one or more MDTs (e.g., to determine whether usage exceeds a threshold as described above). In another example, the controller may instead (or in conjunction with determining bandwidth usage) also determine bandwidth waste (unused capacity) of one or more other MDTs in the network in order to perform the optimization described above.

At block 706, the controller may determine whether to modify flows and/or MDTs based on at least the bandwidth usage (and/or bandwidth waste) determined at block 704. In another example, this determination may be based on the bandwidth usage and/or bandwidth waste as well as relative distances of nodes (e.g., replication point for a given traffic relative to one or more PEs that may not need/want the flow but nevertheless receive the flow). This may be performed as described above with reference to Table-2 and Table-3 (determining access bandwidth).

In determining whether to modify the flows and/or the MDTs, the controller may utilize the determined usage and/or waste bandwidths as well as the distance(s) in any known or to be developed manner. For instance, a weighted combination of bandwidth usage, waste and/or distances maybe used. In another example, historical performances of various MDTs under various usage and waste conditions may be taken into consideration in making a determination as to whether to modify a flow and/or an MDT or not. Those skilled in the art can readily appreciate that any know or to be developed methodology may be utilized in making the determination at block 706.

In some aspects, the modification may include switching network traffic (flow(s)) from one existing MDT to another, may include modifying MDTs including adding or deleting MDTs, or any combination of moving flows and modifying MDTs.

Once a determination is made as to whether to modify MDTs and/or associated flows at block 706, then at block 708, the controller may generate a policy reflecting the modification. A non-limiting example of this modification is described above with reference to FIG. 6 (e.g., moving flow m to MDT 634).

In one instance, the controller may implement the generated policy.

In one example, the policy may be implemented manually by a network operator using visualization 300 (e.g., drag visualized traffic (flow) from one MDT to another, add/delete MDTs, etc.).

In another example, at block 710, the modification may be transmitted to local policy engines at different sites (and/or different local policy engines at different PEs in the provider network) for acceptable and/or implementation by the PEs.

Figure 8:
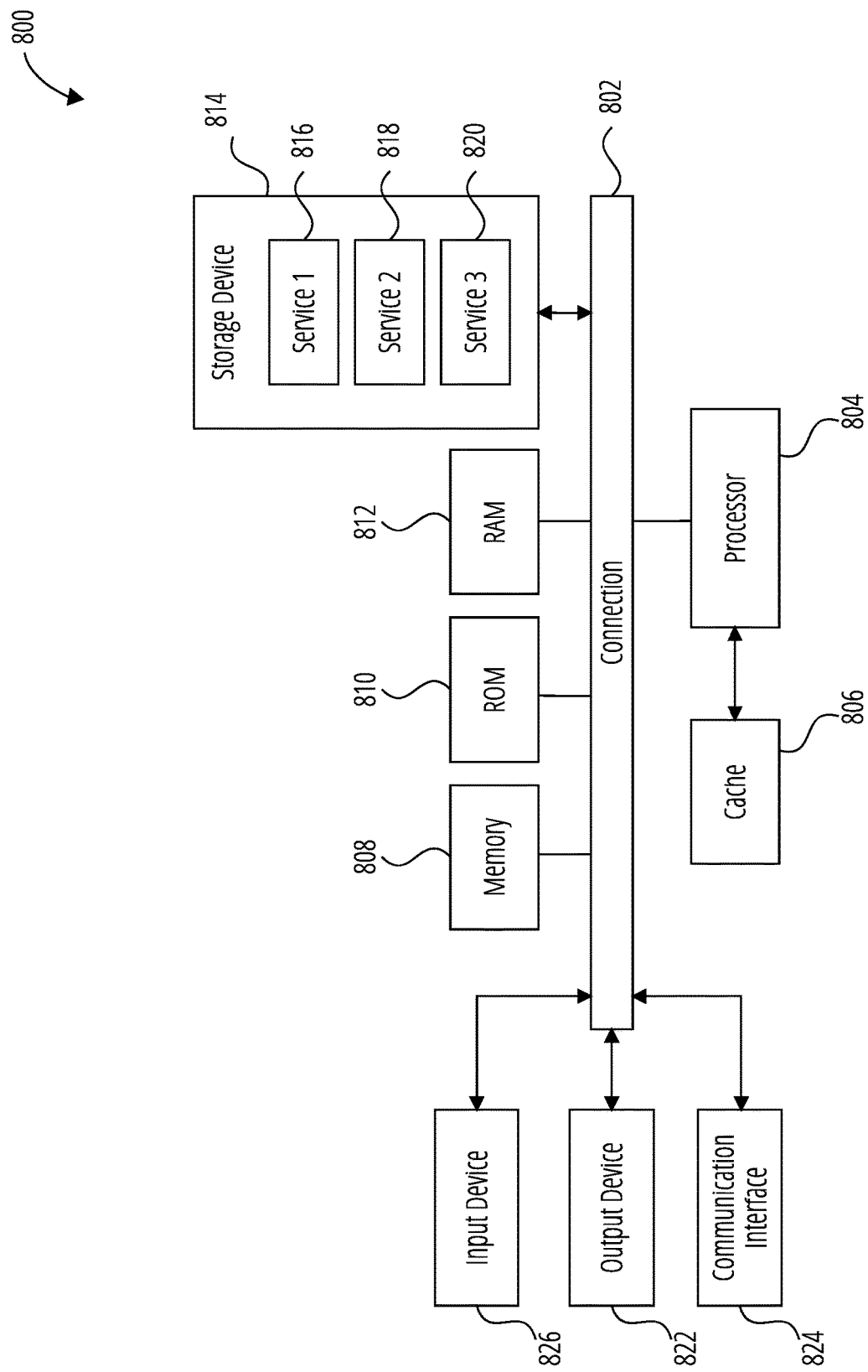
FIG. 8 shows an example computing system according to some aspects of the present disclosure.

FIG. 8 shows an example computing system according to some aspects of the present disclosure. Example computing system 800 may be any one of the components of network architectures described above with reference to FIGS. 1-7 (e.g., any component of systems of FIGS. 1 and 2, a controller of configurations of FIGS. 2-7, PEs described with to FIGS. 2-7, etc.). Components of computing system 800 may be in communication with each other using connection 802. Connection 802 can be a physical connection via a bus, or a direct connection into processor 804, such as in a chipset architecture. Connection 802 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 804 and connection 802 that couples various system components including system memory 808, such as read-only memory (ROM) 810 and random-access memory (RAM) 812 to processor 804. Computing system 800 can include a cache of high-speed memory 806 connected directly with, in close proximity to, or integrated as part of processor 804.

Processor 804 can include any general-purpose processor and a hardware service or software service, such as services 816, 818, and 820 stored in storage device 814, configured to control processor 804 as well as a special-purpose processor where software instructions are incorporated into the actual processor design. Processor 804 may essentially be a completely self-contained computing system, containing multiple cores or processors, a bus, memory controller, cache, etc. A multi-core processor may be symmetric or asymmetric.

To enable user interaction, computing system 800 includes an input device 826, which can represent any number of input mechanisms, such as a microphone for speech, a touch-sensitive screen for gesture or graphical input, keyboard, mouse, motion input, speech, etc. Computing system 800 can also include output device 822, which can be one or more of a number of output mechanisms known to those of skill in the art. In some instances, multimodal systems can enable a user to provide multiple types of input/output to communicate with computing system 800. Computing system 800 can include communication interface 824, which can generally govern and manage the user input and system output. There is no restriction on operating on any particular hardware arrangement, and therefore the basic features here may easily be substituted for improved hardware or firmware arrangements as they are developed.

Storage device 814 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 814 can include software services, servers, services, etc., that when the code that defines such software is executed by the processor 804, it causes the system to perform a function. In some embodiments, a hardware service that performs a particular function can include the software component stored in a computer-readable medium in connection with the necessary hardware components, such as processor 804, connection 802, output device 822, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
generating a visual representation of one or more multicast data trees over a service provider network, each of the one or more multicast data trees exchanging data between two or more of a plurality of nodes of an entity operating over the service provider network;
determining a respective network bandwidth usage over each of the one or more multicast data trees and a network bandwidth waste based on current bandwidth usage of existing data tunnels of one or more multicast data trees and replication distances associated with the plurality of nodes;
modifying the one or more multicast data trees based on at least a weighted combination of the respective network bandwidth usage over each of the one or more multicast data trees, and the network bandwidth waste over each of the one or more multicast data trees, and the replication distances to yield a modification;
generating a traffic routing policy to implement the modification; and
transmitting a notification to a subset of the plurality of nodes affected by the traffic routing policy.

2. The method of claim 1, further comprising:
implementing the traffic routing policy using the visual representation of the one or more multicast data trees.

3. The method of claim 2, wherein implementing the traffic routing policy comprises:
visually modifying at least one of the one or more multicast data trees.

4. The method of claim 1, wherein modifying the one or more multicast data trees comprises:
generating at least one new multicast data tree to be used for network traffic routing.

5. The method of claim 4, wherein the at least one new multicast data tree is generated if the respective network bandwidth of at least one of the one more multicast trees exceeds a threshold.

6. The method of claim 1, wherein modifying the one or more multicast data trees is further based on a respective distances between two or more of the plurality of nodes associated with each of the one or more multicast data trees.

7. The method of claim 1, wherein each of the plurality of nodes is a provider edge node associated with the entity.

8. A network controller comprising:
one or more memories having computer-readable instructions stored therein; and
one or more processors configured to execute the computer-readable instructions to:
generate a visual representation of one or more multicast data trees over a service provider network, each of the one or more multicast data trees exchanging data between two or more of a plurality of nodes of an entity operating over the service provider network;
determine a respective network bandwidth usage over each of the one or more multicast data trees and a network bandwidth waste based on current bandwidth usage of existing data tunnels of one or more multicast data trees and replication distances associated with the plurality of nodes;
modify the one or more multicast data trees based on at least a weighted combination of the respective network bandwidth usage over each of the one or more multicast data trees, the network bandwidth waste over each of the one or more multicast data trees, and the replication distances to yield a modification;
generate a traffic routing policy to implement the modification; and
transmit a notification to a subset of the plurality of nodes affected by the traffic routing policy.

9. The network controller of claim 8, wherein the one or more processors are further configured to execute the computer-readable instructions to implement the traffic routing policy using the visual representation of the one or more multicast data trees.

10. The network controller of claim 9, wherein the one or more processors are further configured to execute the computer-readable instructions to implement the traffic routing policy by visually modifying at least one of the one or more multicast data trees.

11. The network controller of claim 8, wherein the one or more processors are further configured to execute the computer-readable instructions to modify the one or more multicast data trees by generating at least one new multicast data tree to be used for network traffic routing.

12. The network controller of claim 11, wherein the at least one new multicast data tree is generated if the respective network bandwidth of at least one of the one more multicast trees exceeds a threshold.

13. The network controller of claim 8, wherein modifying the one or more multicast data trees is further based on a respective distances between two or more of the plurality of nodes associated with each of the one or more multicast data trees.

14. The network controller of claim 8, wherein each of the plurality of nodes is a provider edge node associated with the entity.

15. One or more non-transitory computer-readable media comprising computer-readable instructions, which when executed by one or more processors of a network controller, cause the network controller to:
  generate a visual representation of one or more multicast data trees over a service provider network, each of the one or more multicast data trees exchanging data between two or more of a plurality of nodes of an entity operating over the service provider network;
  determine a respective network bandwidth usage over each of the one or more multicast data trees and a network bandwidth waste based on current bandwidth usage of existing data tunnels of one or more multicast data trees and replication distances associated with the plurality of nodes;
  modify the one or more multicast data trees based on at least a weighted combination of the respective network bandwidth usage over each of the one or more multicast data trees, the network bandwidth waste over each of the one or more multicast data trees, and the replication distances to yield a modification;
  generate a traffic routing policy to implement the modification; and
  transmit a notification to a subset of the plurality of nodes affected by the traffic routing policy.

16. The one or more non-transitory computer-readable media of claim 15, wherein the execution of the computer-readable instructions by the one or more processors further cause the controller to implement the traffic routing policy using the visual representation of the one or more multicast data trees.

17. The one or more non-transitory computer-readable media of claim 16, wherein the execution of the computer-readable instructions by the one or more processors further cause the controller to implement the traffic routing policy by visually modifying at least one of the one or more multicast data trees.

18. The one or more non-transitory computer-readable media of claim 15, wherein the execution of the computer-readable instructions by the one or more processors further cause the controller to modify the one or more multicast data trees by generating at least one new multicast data tree to be used for network traffic routing.

19. The one or more non-transitory computer-readable media of claim 18, wherein the at least one new multicast data tree is generated if the respective network bandwidth of at least one of the one more multicast trees exceeds a threshold.

20. The one or more non-transitory computer-readable media of claim 15, wherein modifying the one or more multicast data trees is further based on a respective distances between two or more of the plurality of nodes associated with each of the one or more multicast data trees.

* * * * *